United States Patent [19]
Taylor

[11] 3,835,545
[45] Sept. 17, 1974

[54] DEVICE FOR PRE-LOCATING THE THUMB AND FINGER HOLE PLACEMENTS IN A BOWLING BALL

[76] Inventor: Wilson G. Taylor, Box 1421, Lake Arrowhead, Calif. 91803

[22] Filed: Apr. 19, 1973

[21] Appl. No.: 352,539

[52] U.S. Cl. ............................................. 33/174 F
[51] Int. Cl. ............................................. G01b 3/14
[58] Field of Search............ 33/174 F, 174 G, 174 B

[56] References Cited
UNITED STATES PATENTS

| | | |
|---|---|---|
| 2,516,694 | 7/1950 | Gillett.............................. 33/174 F |
| 3,238,628 | 3/1966 | Snakard............................ 33/174 F |

Primary Examiner—Louis R. Prince
Assistant Examiner—Willis Little
Attorney, Agent, or Firm—Forrest J. Lilly

[57] ABSTRACT

A device for pre-locating the finger and thumb hole placement in a bowling ball in relation to a sideward located unbalancing weight, placed in a novel predetermined position, to give a bowler a preselected ball performance irrespective of the bowler's method of delivery of the ball.

5 Claims, 23 Drawing Figures

FULL ROLLER    3/4 ROLLER    SEMI-ROLLER    SEMI-SPINNER    SPINNER

FULL ROLLER    3/4 ROLLER    SEMI-ROLLER    SEMI-SPINNER    SPINNER

PATENTED SEP 17 1974　3,835,545

DEVICE FOR PRE-LOCATING THE THUMB AND FINGER HOLE PLACEMENTS IN A BOWLING BALL

FIELD OF THE INVENTION

This invention relates generally to bowling balls, and more particularly to the art of unbalancing a bowling ball, within tolerances allowable by bowling regulation bodies, to produce desired ball paths to the pins, particularly in regard to the "roll" and "hook" used or sought by expert players.

DESCRIPTION OF THE PRIOR ART

In the manufacture of bowling balls, the upper half or hemisphere is conventionally made heavier than the lower half by a predetermined amount, say 2 to 4 ounces. The amount of such excess weight in the top half is designed to compensate for the amount of material removed in the subsequent drilling of the finger and thumb holes in the top half. The tolerance for excess weight as between top and bottom halves is set by authorities at ± 3 ounces. The center of gravity of the ball, after making, but before drilling, is determined experimentally, and a marker, such as a cross, or the maker's emblem, is engraved in the surface of the ball directly over the location of the center of gravity, in the central area of the weighted top half of the ball. The manufacturer's trademark is generally applied in this same area.

If the original excess weight of the top half were to have been 3 ounces, and 2 ounces were removed by drilling, the remaining excess weight, called "top weight," would be 1 ounce. Regulations have been promulgated limiting such top weight to 3 ounces.

This top weight was eventually discovered to affect helpfully, for some bowlers, though in an inconsistent manner, the "rolling" and "hooking" performance of the ball. The type of roll and hook so obtained, other things being equal, depends upon the bowler's ball track, resulting from his individual style of delivering the ball. The bowler's track, it must be understood, is the circle around the ball on which the ball spins and rolls after delivery by that bowler; and the circle is usually a "small circle" rather than a "great circle" of the ball.

It should also be understood that a hook of any consequence at all results not from mere spin imparted by the bowler. The moderately effective hook that was the unanticipated by-product of top-weight results, instead, from precession. Imagine a ball rolling down the distant end portion of the lane, nearing the pins. The ball will be rolling on a track depending upon the bowler's delivery. Assume the center of gravity of the top-weighted ball to be to the left (viewing the ball from behind) of the ball contact point with the alley when the center of gravity marker is going over the top. A downward gravitational force will then act at the center of gravity of the unbalanced ball at a moment arm whose length is the distance from the ball contact point to a vertical line through the center of gravity. The ball, with the ball track acting as a gyroscopic rotor, will respond to this force, or torque, by precession, e.g., a curve toward the left. I refer to this as positive precession. It may then occur that the center of gravity of the ball will be to, or a little to the right of, the ball contact point after 180° of rotation beyond the first described position. The positive precession (to the left) will then be stopped, or even reversed, to become negative precession. This performance from surplus top weight, thus sometimes gives a useful degree of hook, but it is pulsating and sometimes even alternating, and while helpful, under certain conditions, does not yield a steady curve, and is of little or no use in the case of some types of ball tracks.

An individual bowler's natural track, moreover, does not necessarily yield, as a by-product of surplus top weight, the rolling and hooking performance that he might desire, even though he may deliver the ball in a proper manner.

Accordingly, it is a purpose of the invention to provide a system of weighting a ball, in relation to any bowler's own natural track, to obtain a preselected hooking performance, or other performance, notwithstanding that the bowler's mode of delivery and track would not normally produce such performance as a result of top-weight caused precession. The performance of the ball is thus made independent of the style of delivery. Stated another way, the ball is weighted in such a way that the bowler's normal delivery will result not in the performance normally expected, or not expected, from top weight, depending upon the bowler's track, but in some other desired performance, e.g., a sharper hook, notwithstanding that the bowler retains his normal delivery and normal type of ball track.

BRIEF DESCRIPTION OF THE INVENTION

The present invention can best be understood in connection with the drawings, but it will be said at this point that the invention contemplates, first, the implanting into the new ball, just under its surface, of what I term a "side-weight." In a preferred example, the cavity for this side weight is drilled radially into the ball at a point measured 5 inches on the surface of the ball from the conventionally provided center of gravity marker in the top of the ball. This corresponds, for a standard 27 inch ball, to an angle of 66.6° between a vertical axis through the center-of-gravity marker and the radial axis of the side weight cavity to be drilled. Next, a ball recently used by the bowler is examined to determine the ball track thereon, and measurements are made from the ball track to the near finger hole, and to the thumb hole, on this ball. Thus a "pattern" comprising the bowler's ball track line and an imaginary line tangent both to the near finger hole and to the thumb hole has been established. Instead of using the "tangent line" for my finger and thumb hole measurement pattern, however, I generally use, instead, a center line running between the center of the thumb hole and a half way point between the finger holes. This center line of course has a fixed acute angle relation to the tangent line mentioned immediately above.

This pattern of ball track and center line is to be transferred, either by means of a template or otherwise, to the new ball in a predetermined relationship to the implanted side weight such as will yield the ball performance preselected by the user. The finger and thumb hole centerline, in relation to the new ball, being one leg of the V-pattern, goes right over the center of gravity marker, so that the finger holes and thumb hole can be located on opposite sides of the c.g. marker. The ball track line of the ascertained pattern exists in imagination at this time as the other leg of the V-pattern. An imaginary line perpendicular to the track line and passing over the center of gravity marker designates the moment arm at which an implant weight at the opposite end of said perpendicular line from the track line will act most forcibly on the ball, to provide maximum precession. To obtain maximum precession (e.g. sharp hook), I thus arrange the pattern, by rotating it about the center-of-gravity marker as a pivot point, so that this perpendicular line (moment arm) will substantially intersect, or lie alongside of, the implanted side-weight; or this perpendicular line (moment arm) can be located at other positions relative to the side weight, at which moment arm distance is lessened, and precession reduced accordingly. With the pattern preselectively arranged, pencil marks are made on the ball along the center line of the finger and thumb holes, and the finger and thumb holes are drilled into the new ball in proper relation to this finger and thumb hole center line. The latter will be recalled to be one leg of the bowler's own individual V-pattern. The bowler's individual ball track will become or coincide with the other leg of the V-pattern.

To facilitate these procedures, the invention provides two outer and inner semi-spherical template caps adapted to nest together and to be individually centrally pivoted on the top dome of the ball by means of a temporary pivot stud, located exactly over the c.g. marker. These caps are preferably relatively thin-walled plastic moldings, and at least the outer cap should be transparent or semi-transparent. The inner cap has a pair of aligned diametric slots on opposite sides of its center for marking the finger and thumb hole center line on the ball. Beyond, and aligned with one of these slots, is a hole representative of a thumb hole and beyond the other, equally spaced on opposite sides thereof, are two holes representative of a pair of finger holes.

The outer template cap fits rotatably over the inner cap. It has inscribed or marked on it a selected number of typical arcuate ball tracks such as would be seen on different bowler's balls owing to their different styles of release. There may be, for example, three of such tracks, full roller, three-quarter roller, and spinner. These are parallel to one another, at different distances from the center of the cap. Crossing the center of the cap, at right angles to these tracks is an arcuate slot, and this slot receives the pivot stud mentioned earlier, so that the outer cap can pivot on the stud, or be transported along the stud.

The outer template cap may have, on its perimeter, position indicators or designations, as "Maximum Positive," "Medium Heavy Positive," "Medium Positive," "Minimum Positive," "Minimum Negative," etc., which, when positioned adjacent to the implant side weight, establishes a corresponding moment (side weight × moment arm length), e.g., a long moment arm for Maximum Positive.

The center line slot on the inner template constitutes one leg of the bowler's previously ascertained V-pattern, and the other leg is visually completed by positioning the selected ball track of the outer template in proper angular relation to the center line and finger-holes of the inner template, using the measurements previously taken from the bowler's most recent ball. The outer template is then fixed to the inner template against relative rotation therebetween. They may, however, rotate as a unit on the pivot. To select the bowling ball performance wanted by the bowler, the inner template and outer template are rotated until the implant side weight is alongside any one of several performance indicators on the perimeter of the outer template. With selected performance established, the inner template is fixed to the ball against pivotal movement on the ball, the outer template is removed from the ball, and a pencil inserted in the diametrical slots in the inner template is used to mark the center line for the thumb and finger holes in the new ball. When these are drilled the ball will then provide the selected performance, with the bowler using his normal delivery and normal ball track.

GENERAL DISCUSSION AND DESCRIPTION OF A PREFERRED EMBODIMENT

Figure 1:
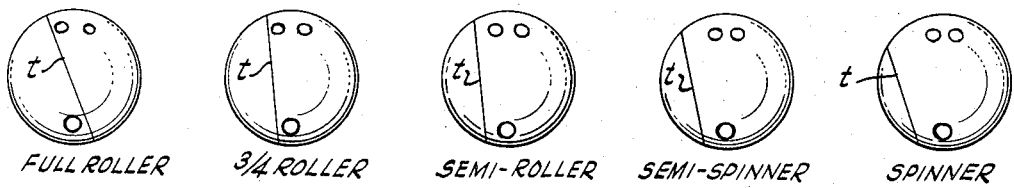
FIG. 1 is a diagram showing bowling balls with a number of different representative ball tracks indicated thereon.
Figure 2:
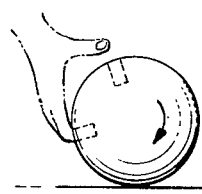
FIG. 2 is a diagram of a bowling ball and a representation of a hand having a thumb and fingers in the act of delivering the ball.
Figure 3:
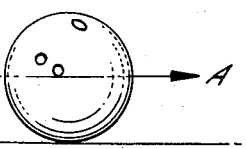
FIG. 3 is a diagrammatic view showing a bowling ball having a "full roller" type of track spinning down the alley towards the pins, represented by a triangle, the arrow representing the axis of rotation of the full roller ball.
Figure 4:
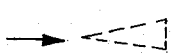
FIG. 4 is a view similar to FIG. 3, but showing a ball having a ball track which is lesser than a great circle.

Some bowling ball theory, not all of which is common knowledge, is a prerequisite to an understanding of the invention, and will now be given. Depending upon a bowler's delivery, the position of his hands and fingers, and the degree of thrust given by the fingers in the delivery of the ball, various ball tracks and flight paths down the alley, as well as the ultimate hooking pattern, are possible in absence of the present invention. The condition of the alley, dry or oily, polished or frictional, also plays a large part. The diagrams of FIG. 1 show a group of typical ball tracks $t$, from full roller, in which the ball track is a great circle passing between the thumb hole and the finger holes, through three-fourths roller, semi-roller, simi-spinner and spinner. In FIG. 1, the view may be regarded as looking down on the balls, which are stationary, the trademark and c.g. marker facing up. As known to expert bowlers generally, these ball tracks are achieved by lifting with the fingers as the thumb is withdrawn (FIG. 2). More or less ball spin can be generated by the sharpness of lift, and the orientation of the spin axis depends upon the relative position of the wrist and fingers during this lift. The full roller ball spins on an axis A parallel with the lane (FIG 3). A ball with a smaller track spins with its axis A tilted downwards in the forward direction (FIG. 4).

Upon contacting the lane, the released ball at first spins, while skidding, and does not usually roll immediately. Examination of a used ball will show numerous scratch marks transversely across the track, and these are skid marks made before the ball gets into a rolling attitude. The phenomena known as gyroscopic inertia maintains the spin axis angle and the track angle. As the spinning ball finally secures a little traction with the alley, it begins a little rolling action, which progressively increases, and thereby, the ball pivots on its contact point with the alley until the plane of the ball track is generally longitudinally down the alley, and usually almost parallel therewith. The plane of the ball track is of course parallel with the direction of the ball. With a track circle smaller than the circumference of the ball, this plane is tilted toward the left, as seen from in front of the approaching ball. The track is always in contact with the alley at the bottom, and in this left tilted plane extending longitudinally of the alley after it has gained good rolling traction with the alley. Both during the skidding and spinning, and during the rolling stages, the ball is susceptible to precessional influence from the top weight, which will presently be described.

Various kinds of unbalance of a top-weighted ball are of interest and will be described.

Figure 5A:
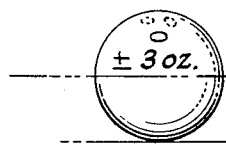
FIGS. 5a, 5b and 5c, show bowling balls with weight unbalance tolerances indicated thereon, FIG. 5a being a front elevation of a ball, with the heavier hemisphere on top, FIG. 5b showing a ball from above, with a medial vertical dividing plane, and showing ball weight tolerance permitted to the side of this medial plane, and FIG. 5c being also a plan view, but with a medial vertical plane at right angles to that of FIG. 5b.
Figure 5A:
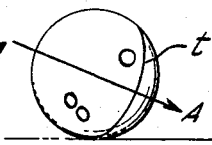
Figure 5B:
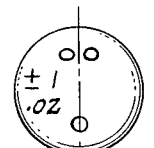
Figure 5C:
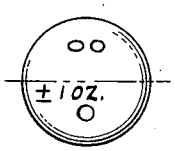

Possible unbalances and their permitted tolerances are diagrammed in FIGS. 5a, 5b and 5c, in which FIG. 5a is a side elevation, with the top (heavy) side up, FIG. 5b is a front elevation, and FIG. 5c is a plan view showing a ball with its heavy side up.

FIG. 5a indicates that the top half is permitted ± 3 ounces of top weight; FIG. 5b shows that ± 1 ounce of lateral side-weight is permitted; and in the plan view of FIG. 5c, it is shown that ± 1 ounce of vertical side weight is permitted on either side of a vertical diametrical plane as the ball is viewed from above with its heavier hemisphere located on top. The latter type of unbalance usually is introduced by location and size of the thumb and finger holes.

Thus, after drilling, the ball may have any of the described unbalances, and combinations thereof; and these result in shifts in the position of the center of gravity which may substantially affect the performance of the ball.

Figure 6:
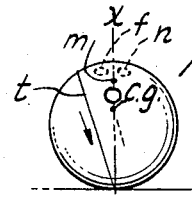
FIG. 6 is a view of a conventionally top-weighted bowling ball seen from the pins, rolling towards the pins.

FIG. 6 shows, from in front, a ball undergoing the final rolling action of the approaching ball on its track, as viewed from the pins. The ball track $t$ is tilted to the left, and the heavy side of the ball is just starting down from the top. The center of gravity marker $m$ is a little past top center, and the finger holes $f$ are nearing the top, while the thumb hole $h$ is over the top and coming down on the near side of the approaching ball. The actual center of gravity c.g., is marked, and is seen to be on the vertical axis X-Y passing through the ball contact point. Gravitional force through c.g. acts at zero moment arm, so causes no torque on the ball. No precession is therefore induced at this point.

Figure 7:
FIG. 7 is a view similar to FIG. 6, but showing the ball in a position nearing 180° of a revolution later.

FIG. 7 shows the same ball, again from in front, approximately 180° of revolution later. Note that the c.g. has travelled through a half circle, parallel to the track, and gravity now acts downwardly on the ball through the newly positioned c.g. at moment arm m.a. The ball is thus torqued clockwise, as seen from the pins; but instead of moving clockwise, the ball precesses to the left, as would be seen by the bowler. This movement, in different cases, could be anything from gradually leftward across the alley, to a late left hook, depending upon the condition of the alley, and the magnitude of the moment. Unfortunately, on the next half revolution of the rolling ball, i.e., in going back to the position of FIG. 6, the c.g. moves back, parallel to the track, toward vertical alignment with the axis X-Y, so the tendency for the precession then reduces to zero.

Figure 8:
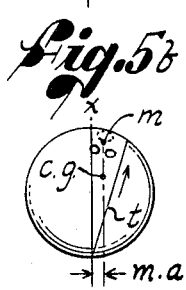
FIG. 8 is a view looking from the bowler's position toward the ball which is moving toward the pins, and showing lateral displacement of the center of gravity toward the right.
Figure 9:
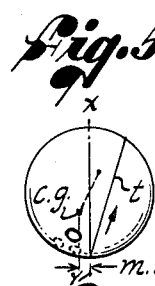
FIG. 9 is a view similar to FIG. 8, but showing the ball one-half revolution beyond the position of FIG. 8.

In FIG. 8 and FIG. 9, which in this case view the ball from the bowler, the ball is both top heavy, and laterally unbalanced, such that c.g. is on the right side of the vertical axis X-Y' for a half turn, with the ball heavy side up, and then on the left for a half turn, while the heavy side is down, so the moment reverses direction every half turn, and the ball has a precessing tendency alternately right and then left, as seen by the bowler.

Figure 10:
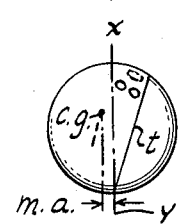
FIGS. 10 and 11 are views of a top-weighted ball, rolling away from the bowler, with center of gravity laterally displaced still further to the left, FIG. 10 showing the top-weighted half of the ball uppermost, and FIG. 11 showing the ball 180° of a revolution later.
Figure 11:
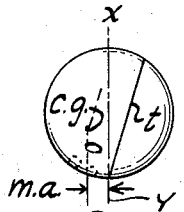

As shown in FIGS. 10 and 11, viewing a top heavy ball again from the position of the bowler, with the ball laterally unbalanced such that the c.g. is displaced a little to the left of center when the heavy side of the ball is up (FIG. 10), and even more to the left of center when the heavy side of the ball is down. Thus, there is obtained a pulsating leftward precession, which may be a tendency for a gradual but intermittent leftward movement as the ball goes down the alley, or there may be a weak hook.

A leftward bearing travel, or a hook, from surplus top weight is thus sometimes noted; but the performances obtained leave something to be desired.

Figure 12:
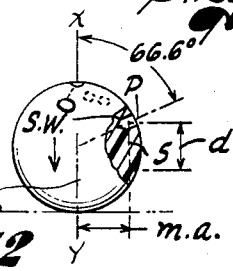
FIGS. 12 and 13 show, respectively a front elevation of a rolling side-weighted ball, as viewed from the pins, and a plan view thereof ball with a full roller track in accordance with the invention.
Figure 13:

The side-weighted ball, in accordance with the invention, is diagrammed in front elevation (as seen approaching an observer at the pins) and from the top, in FIGS. 12 and 13, respectively. The alley is designated at 5, and the ball is rolling toward the pins on a full roller track 6. At the instant, the c.g. marker $m$ is on top. The implanted side weight s.w., which has a carefully predetermined weight of approximately an ounce, is shown centered at a point on the ball spaced 5 inches from the marker $m$ (for a standard 27 inch ball). The 5 inch distance is equivalent to an angular spacing of 66.6°. This may be generalized to approximately 67° with the understanding that even this angle must be understood as having substantial tolerance. I have selected this approximate location as preferred, for the reason that in practice it has turned out to be an average of the axes of rotations of various types of tracks, and the position most useful in securing the benefits of the invention. Nevertheless, there is a considerable degree of tolerance, except that as the distance from the marker $m$ to the side weight is reduced below 5 inches, the undesirable pulsating effects of "top weight" are gradually increased, and the more regular effects of "side-weight" diminished. As the distance is made greater than 5 inches, the implant side weight falls below the average axis of rotation, and depending upon the position of the rotation, can cause the same undesirable pulsating effects of top weight, as a side weight implanted less than 5 inches from the c.g. marker.

Referring again to FIGS. 12 and 13, which show the case of a full roller ball track 6, it will be clear that the side weight s.w. will have a long moment arm distance m.a. from the ball track, and therefore, a large gravitational moment to cause precession to the left. It should be evident that the sideward location of weight s.w. will produce a much larger moment than was available from "top weight." Attention is also drawn to the fact that the center of gravity of the weight s.w. in this case will move in a circle $s$, in a vertical plane, parallel with the track 6, the circles having a relatively small diameter $d$. The moment arm of the side weight thus remains constant and steering precession is constant.

Figure 14:
FIG. 14 is a view similar to FIG. 12, but showing the performance of a side-weighted ball having a ball track which is lesser than a great circle of the ball.
Figure 14:
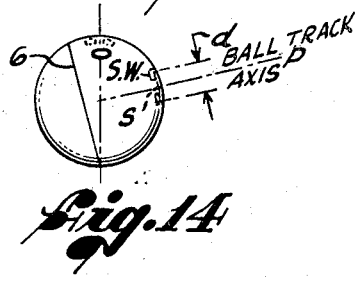

FIG. 14 is generally similar to FIG. 12, but shows a circular ball track 6 which is somewhat smaller than a full roller great circle track. The side weight s.w. is positioned for approximately maximized moment arm for the particular ball track. The present invention allows for various preselected moment arm lengths, as will appear; and the one here shown is thus just one of these, its individual characteristic being, however, to provide virtually maximum precession for the ball track shown. As will appear, cyclic variation in precession has been reduced to an inconsequential amount. Owing to gyroscopic inertia, the ball track 6 and the perpendicular axis P thereof remain fixed as the ball spins and rolls. The side weight s.w. moves in a relatively small circle track $s'$, parallel to the track 8. Lateral periodic (horizontal) excursion of the side weight, relative to the original c.g. of the ball, for each ball revolution is very small and inconsequential. The moment arm of the side weight s.w., i.e., the distance from ball track 6 to s.w., remains virtually contant. Thus, the precession produced by the side weight s.w. is both predetermined, and practically constant, for the tilted, "small circle" ball track.

Figure 15:
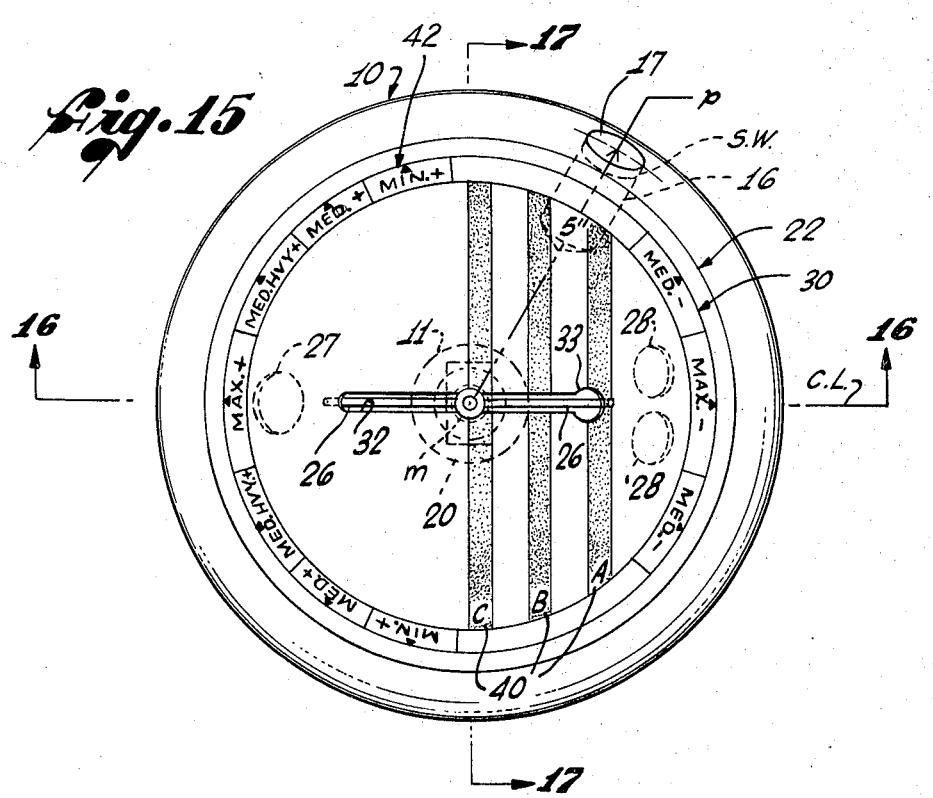
FIG. 15 is a plan view of a bowling ball with the two template caps mounted thereon, as prepared by the original manufacturer.

Refer now to FIG. 15, showing a newly manufactured ball 10, with one form of top weight 11 built into its top hemisphere, and over which is a more or less accurately placed center of gravity marker $m$.

A radial bore 16 is drilled into the ball with its axis at a preferred spacing distance of 5 inches along an arcuate ball surface line from the center of the marker $m$. For a standard 27 inch ball, the axis of this bore is then 66.6° from the vertical axis of the ball when the marker $m$ is on top. Some latitude is of course allowed in the angular location of this bore down from the vertical. The expressions "substantially 5," or substantially 66.6°, or 67°, will be used herein and in the claims to include the tolerances with which the substantial benefits of the invention are obtained. An unbalancing "side weight" s.w., of about an ounce in weight gain, is located in this bore a short distance below the surface of the ball, and the space outside the weight suitably plugged or capped, as indicated at 17.

Figure 16:
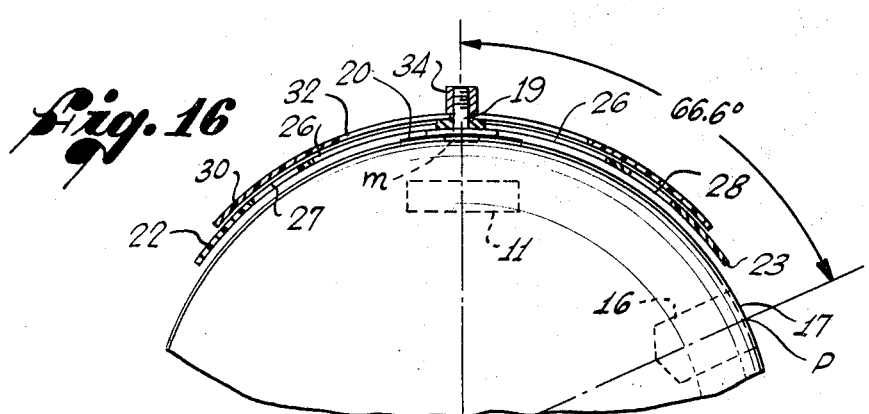
FIG. 16 is a partial transverse vertical section on line 16—16 of FIG. 15.
Figure 17:
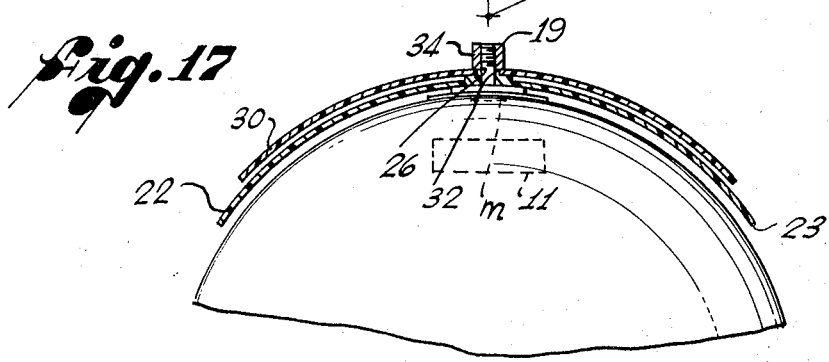
FIG. 17 is a partial transverse section taken on line 17—17 of FIG. 15.

As seen in FIG. 16, a pivot post 19 is secured directly over locating marker $m$ by means of a flange 20 adhesively secured to the ball. A spherical shaped inner template or template cap 22 fitting loosely and rotatably over the ball is pivotally mounted on the post and is dimensioned so that its bottom peripheral edge 23 is near or substantially contacts the outer end of the side weight cavity 16.

On opposite sides of the pivot center, a pair of aligned circumferential slots 26 are formed in this inner template symetrically about the said pivot post 19, and referential circular thumb and finger holes 27 and 28 indicate thumb and finger hole locations relative to the center and to the center line c.l., defined by the slots 26.

Rotatably mounted on the pivot post 19, over the inner template cap 22, is a performance adjustment template cap 30. Both caps are preferably thin, but stiff and substantial, plastic moldings. The outer cap should be transparent or semi-transparent, but the inner cap can be transparent or opaque. The outer cap 30 has the same radius of curvature as the inner cap 22, and the inner cap nests closely and rotatably therewithin. Thus, the outer cap is rotatable relatively to the inner cap. The cap 30 has a diametrical slot 32, with a key hole 33 at one end, and pivot post 19 passes loosely therethrough. The post may have a head 34 overhanging opposite edges of the slot, but capable of passing easily through the keyhole 33. The outer cap may thus also slide laterally relative to the inner cap.

Inscribed on the cap 30, perpendicularly to the slot 32, is a plurality of spaced parallel lines or stripes 40, one of which is on a great circle of the ball, and the other of which are progressively spaced further and further away from this great circle. In the example shown, there are just three of these stripes, designated A, B and C. These stripes simulate three representative ball tracks, which are deemed adequate from which to make a selection in most cases. More may be used if deemed necessary. The first, A, may simulate a relatively small ball track, such as a spinner or semi-spinner; the second, B, may represent a three-fourths roller; and the third, C, may then be a great circle (full circumference) track, known as the full roller (see FIG.

1). These ball track stripes may be etched, abraded, outlined, as treated in any way to distinguish them on an otherwise transparent cap. Around a marginal band or zone 42 of the outer cap 30 are printed, inscribed or engraved performance designations, such as Max.+, opposite or in line with the end of slot 32 most remote from the ball track stripes 40. Spaced 180° from Max.+ is the designation Max.−. Between these two Max designations, going in opposite directions around the band 42 from Max.+ to Max.−, are following sequence of designations: Max.+, Med. Hvy.+, Med.+, Min.+, Min.−, Med.−, Max.−.

The method of locating the thumb and finger holes comprises first determining the "track" of the bowler for whom the new ball is being prepared by examining the ball he is presently using. The lateral distance of the track is measured from the thumb hole and the adjacent finger hole of the old ball, or visually estimated, and the outer template 30 is then adjusted until the selected track (A, B or C) of the outer template is, in relation to the center line c.l. of the inner cap on the new ball, in the approximate position of the track on the used ball. The outer cap 30 is then secured to the inner cap against rotation by the use of a piece of adhesive tape 43. The V-pattern of track line on the outer cap and finger and thumb hole center line c.l. on the inner cap for the particular bowler is thus transferred to and overlies the new ball.

Figure 19:
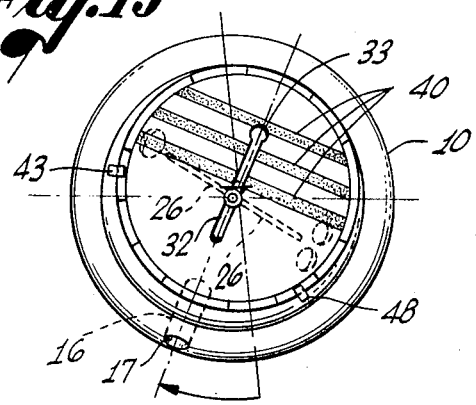
FIG. 19 is a view similar to FIG. 18, but with the two templates, now secured to one another to move as a unit, shifted to a selected performance position.
Figure 20:
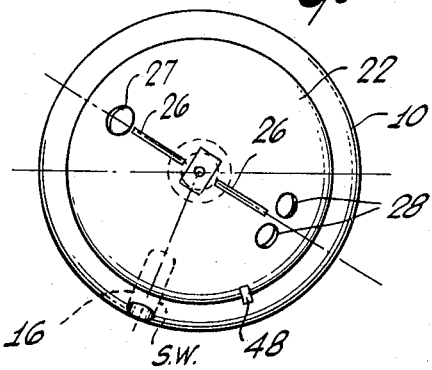
FIG. 20 is a top plan view showing the upper template cap having been removed, with the lower template cap remaining to permit marking of the center line of the thumb and finger holes directly onto the ball, in correct relationship to the side weight implanted in the ball.

The next step is to inquire of the bowler the bowling ball "performance" he desires. If he wants Maximum Positive Precession, the taped-together templates 22 and 30 are pivoted as a unit so that the performance indicator position on the perimeter of the outer template, designated Max.+, is opposite the side weight, (FIG. 19).

Figure 21:
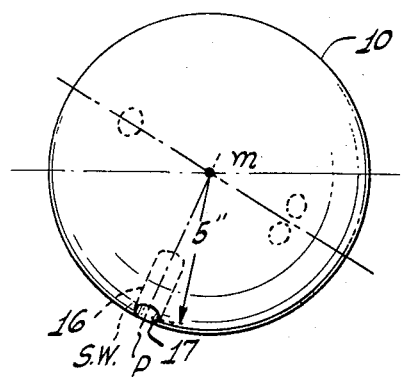
FIG. 21 shows the ball of FIG. 20 with the inner template cap removed, and showing the center line for the thumb and finger holes, as well as the referential thumb and finger holes, marked on the ball, which is then ready for drilling of the actual finger holes.

When the performance indicator position has been thus established, the inner template 22 is fixed to the ball with a tape such as 48, and the outer template 30 is removed from the ball. A pencil is then inserted in each of the center line slots 26, and a center line is drawn on the ball. Referential finger holes are also drawn on the ball through the cut-out thumb and finger holes in the inner cap. The inner template cap and pivot post are then removed. A pattern of thumb and finger holes is then drilled in the ball, not exactly where indicated by the markings already made, which are for rough guidance only, but in proper relation to the center line and locating point $m$ and in the exact spacing for the bowler's established grip, (FIG. 21).

Thus, regardless of a bowler's grip, delivery and ball track normally resulting therefrom, his ball can, by the present invention, be fitted with a side weight, so located, and of such weight that the bowler will now execute some advantageous preselected ball performance other than or more reliable than the ball performance available to him through the use of top weight unbalance.

The use of the templates in conjunction with the side weight s.w., provides for the precise placement of the side weight, in accordance with a desired ball performance, for a right-handed and left-handed bowler, regardless of the type of ball track, and regardless of the performance previously obtained from top weight unbalance.

The system has been primarily described hereinabove as though positive precession, in various degrees, were the exclusive objective. In some cases, however, the use of negative precession is more desirable, in order to assist the bowling ball in the achievement of an acceptable "roll" point on the lane. Examples of conditions which often require negative precession include excessively oily lanes and excessively dry lanes. In these and other situations where negative precession is useful and desired, the negative performance positions on the perimeter of the outer template cap may then be used, causing the torque exerted by the side weight s.w., to act with an oppositely extending moment arm, so as to exert a reversed precession effort on the ball. This reversed or negative precession on the ball causes the ball to roll sooner, whereas positive precession causes a ball to roll later. The achievement of an acceptable roll point is highly desirable, in scoring well, because a ball which rolls too soon, or too late, does not knock pins down with maximum proficiency.

Figure 18:
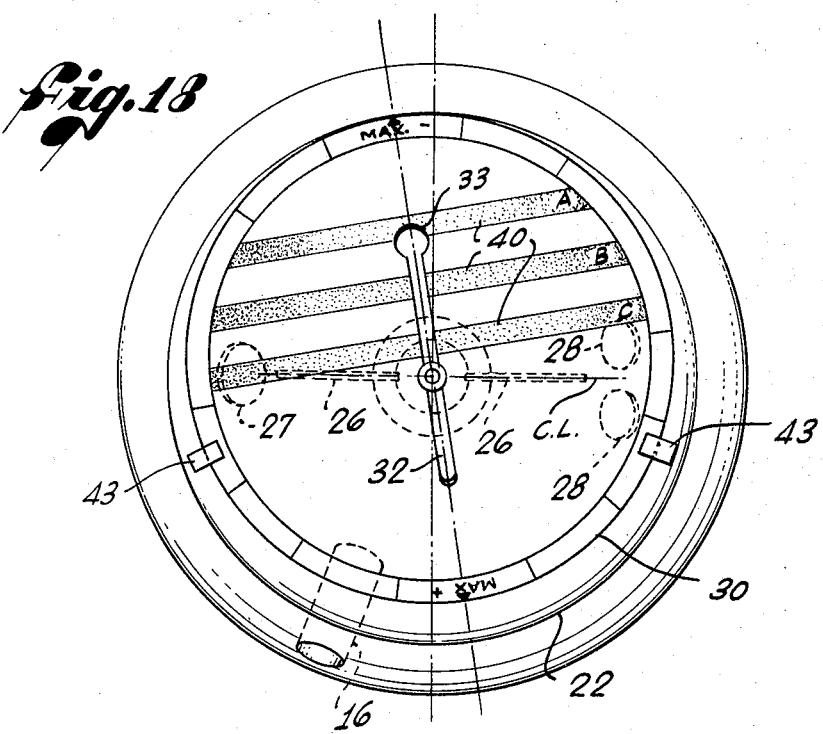
FIG. 18 is a view similar to FIG. 15, but with the templates adjusted to a particular position of adjustment relative to one another.

The performance designations on the periphery of the cap progress in two identical sequences around opposite sides of the cap, one sequence being generally toward the fingers when the inner and outer caps are in their relative positions of adjustment, as exemplified in FIGS. 18 and 19, and the other sequence being generally toward the thumb. This dual range of performance designations allows the ball driller to position the side weight either generally toward the fingers or generally toward the thumb when provision must be made for extra large or small finger or thumb holes and the balance weight removed thereby.

The invention in its several aspects has now been fully described in relation to prior art practices. It will be seen that the invention has several aspects, such as a novel method for locating the thumb and finger holes relative to an implanted side weight according to the needs of a particular bowler, a novel template for carrying out this method and a resulting ball which is characterized by an unique relationship of side weight to finger and thumb hole pattern for causing a particular desired behavior of the ball, not naturally obtained by the bowler. The template in particular is shown in a present preferred physical form, but is subject to various changes in design, structure and arrangement without departing from the spirit and scope of the appended claims.

I claim:

1. A device for pre-locating the thumb and finger hole positions of a new bowling ball for an individual bowler whose style of delivery normally produces an individualistic ball track, which ball has a center of gravity marker thereon and has implanted just below its surface an unbalancing side weight located on a radius of the ball which is at an angle of the order of 67° from a radial line substantially intersecting said center of gravity marker, the combination of:

a pivot stud removably mounted on the ball over said center of gravity marker, a template generally conforming to the shape of the bowling ball and rotatably mounted at a pivot point thereof on said pivot stud, said template having therein slot means aligned with said pivot point to locate a finger and thumb hole center line, and through which a mark may be made on the ball to simulate a center line for the thumb and finger holes on the ball, a pattern determining template generally conforming to the shape of the bowling ball and having a slide-pivot mounting on said stud independently of said first mentioned template, said slide-pivot mounting affording said pattern determining template both rotation on and linear translation along said pivot stud relative to said center line on the first mentioned template, said pattern determining template having thereon a ball track alignment line extending substantially at right angles to the direction of sliding translation of said last mentioned template relative to said pivot stud, said last mentioned template being pivotal and slidable on said pivot stud to match said track alignment line with a line representative of the bowler's ball track line, at the angle said ball and track makes with thumb and finger hole center line of the bowler's ball, and disconnectible means adapted to connect said templates to one another in a selected position of adjustment to one another, with said thumb and finger hole center line at said angle to the bowler's track line, said templates being then rotatable as a unit on said pivot stud to a position at which said center line slot means of the first template is in a selected position relative to said side weight.

2. The device of claim 1, wherein the slot means of the first mentioned template comprises two aligned slots on opposite sides of the pivot point of said first mentioned template.

3. The subject matter of claim 2, wherein the templates embody nested, relatively rotatable inner and outer spherical caps loosely mounted on the dome of the ball, said caps being relatively rotatable at their centers on said pivot stud, the inner of said template caps having said diametrical slots therein, and the outer of said caps being at least semitransparent, and having an arcuate slot intersecting its center to receive and to pivot and slide on said pivot stud, said outer cap having a plurality of parallel ball track lines inscribed over one half thereof at right angles to said slot.

4. The subject matter of claim 3, including a sequence of ball performance indicia inscribed circularly around said outer template cap and alignable in predetermined angular relationships with said ball track.

5. The subject matter of claim 4, including a sequence of ball performance indicia inscribed circularly around said outer template cap and alignable selectively with said side weight.

* * * * *